United States Patent [19]
Narumoto et al.

[11] Patent Number: 5,811,488
[45] Date of Patent: Sep. 22, 1998

[54] POLYVINYL ALCOHOL POWDER

[75] Inventors: Naoto Narumoto, Okayama; Takanori Kitamura, Kurashiki; Yuji Takenouchi, Nakajo-machi; Takanori Tsugiya; Hisamichi Yanai, both of Kurashiki, all of Japan

[73] Assignee: Kuraray Co., Ltd., Kurashiki, Japan

[21] Appl. No.: 866,392

[22] Filed: May 30, 1997

[30] Foreign Application Priority Data

May 31, 1996 [JP] Japan .................................... 8-138240

[51] Int. Cl.$^6$ .................................................. C08F 116/06
[52] U.S. Cl. .................................................. 525/56; 525/62
[58] Field of Search .................................... 524/503, 557; 525/56, 60, 61, 62

[56] References Cited

U.S. PATENT DOCUMENTS

| | | | |
|---|---|---|---|
| 2,642,419 | 6/1953 | Waugh et al. | 260/91.3 |
| 3,296,236 | 1/1967 | Tanner | 260/91.3 |
| 3,487,060 | 12/1969 | Bristol | 260/89.1 |
| 4,104,208 | 8/1978 | Kido | 525/61 |
| 4,314,032 | 2/1982 | Murayama | 525/58 |
| 4,388,442 | 6/1983 | Taniguchi | 525/61 |
| 5,256,400 | 10/1993 | Froix | 424/45 |
| 5,397,815 | 3/1995 | Carlin | 524/503 |
| 5,502,082 | 3/1996 | Unger | 521/141 |

FOREIGN PATENT DOCUMENTS

| | | |
|---|---|---|
| 271 520 | 9/1989 | Germany . |
| 45-33191 | 10/1970 | Japan . |
| 46-9826 | 3/1971 | Japan . |

*Primary Examiner*—Paul R. Michl
*Attorney, Agent, or Firm*—Oblon, Spivak, McClelland, Maier & Neustadt, P.C.

[57] ABSTRACT

The present invention provides a polyvinyl alcohol powder which comprises a pore having an average diameter of 0.1 to 10 $\mu$m in the range of 0.05 to 0.4 cc/g.

Since the PVA powder of the present invention has an excellent solubility in water, an aqueous solution thereof can easily be prepared industrially.

Since the PVA powder of the present invention has a low content of an organic volatile component and a low content of a nonvolatile component such as a carboxylic acid salt or the like which is derived from a basic catalyst, it has an excellent industrial handleability.

16 Claims, No Drawings

POLYVINYL ALCOHOL POWDER

BACKGROUND OF THE INVENTION

1. Field of the Invention

The present invention relates to a polyvinyl alcohol (hereinafter abbreviated as "PVA") powder.

2. Description of the Related Arts

Since PVA, a typical water-soluble polymer, has many functions, it has been widely used for ordinary fiber, high-strength fiber, fiber processing agent, paper processing agent, adhesive, emulsion stabilizer, film, butyral resin, toiletry, pharmaceutical, ceramic binder and the like.

PVA has been usually produced by alcoholysis reaction of polyvinyl acetate (hereinafter abbreviated as "PVAc") using a basic catalyst. The following methods are known as a process for producing PVA.

According to U.S. Pat. No. 2,642,419 (hereinafter referred to as "prior art (A)"), there is known a method which comprises continuously feeding a mixture obtained from a methanol solution containing 24 to 40 wt. % of PVAc and a methanol solution of sodium hydroxide onto a belt conveyor, and subsequently granulating and drying the gel-like substance obtained by the methanolysis thereof.

According to Japanese Patent Publication No. 33,191/1970 (hereinafter referred to as "prior art (B)") and Japanese Patent Publication No. 9,826/1971 (hereinafter referred to as "prior art (C)"), there is known a method which comprises continuously feeding a methyl acetate-methanol mixed solution containing partially-saponified PVAc having a degree of saponification of 10 to 40 mole % and a methanol solution of a saponification catalyst into a methyl acetate-methanol mixed slurry containing PVA having a degree of saponification of 97 to 98.5 mole % on condition that the concentration of a soluble polymer in a reaction system is 1% or less, and discharging the reaction product therefrom (hereinafter referred to as "slurry saponification"), and subsequently removing liquid and drying thereof.

The PVA powder obtained by prior art (A) has a low time-rate of solubility in water and contains an organic volatile component such as methanol used in the production and methyl acetate derived from the alcoholysis reaction, and a nonvolatile component such as sodium acetate. In the case where the PVA powder contains the organic volatile component, the risk of explosion during the transportation of the PVA powder is caused, the working atmosphere during handling the PVA powder is worsened, and the waste water treatment equipment of the aqueous solution of PVA is required. In the case where the PVA powder contains the nonvolatile component such as sodium acetate, the problem like poor insulation is caused when it is used for electric part, electronic part and ceramic binder.

When the PVA powder obtained by prior arts (B) or prior arts (C) is charged into warm water or hot water, blocks of lumpy powder are formed and the uniform aqueous solution cannot be obtained. Therefore the PVA powder has to be charged into low-temperature water and subsequently the temperature has to be gradually increased and there has been a problem of long time for dissolution. Further, the PVA powder has a low bulk density and a low volumetric efficiency and there has been a problem of high cost of transportation. Furthermore, the PVA powder has a large amount of fine particles and there has been a problem that the fine PVA particles tend to fly off when the bag of the PVA powder is opened.

SUMMARY OF THE INVENTION

It is an object of the present invention to provide a PVA powder which exhibits an excellent solubility in water and has a low content of an organic volatile component.

The present inventors have intensively studied to solve the above-mentioned problems and have found a polyvinyl alcohol powder which comprises a pore having an average diameter of 0.1 to 10 μm in the range of 0.05 to 0.4 cc/g. This finding has led to the completion of the present invention.

DETAILED DESCRIPTION OF THE PREFERRED EMBODIMENTS

The range of the pore volume having an average diameter of 0.1 to 10 μm in the PVA powder (hereinafter referred to as "pore volume") is 0.05 to 0.4 cc/g, preferably 0.05 to 0.2 cc/g.

The content of fine particles having an average diameter of 74 μm or less (200 mesh-pass) in the PVA powder (hereinafter referred to as "fine particle content") is preferably 3 wt. % or less, more preferably 1 wt. % or less. In the case where the fine particle content having the average diameter of 74 μm or less is more than 3 wt. %, the dispersibility of the PVA powder in water is poor, the blocks of lumpy powder tend to be formed and the handleability also becomes poor. The upper limit of the average diameter of the PVA powder is not particularly limited, but it is preferably 4 mm or less (5 mesh-pass), more preferably 2.83 mm or less (7 mesh-pass).

The degree of polymerization of the PVA powder is preferably 300 to 20,000, more preferably 500 to 4,000, most preferably 1,000 to 2,500. The degree of saponification of the PVA powder is preferably 80 to 100 mole %, more preferably 90 to 100 mole %, more preferably 95 to 100 mole %, and most preferably 98 to 100 mole %.

The process for producing the PVA powder of the present invention is not particularly limited, but there is exemplified a process which comprises alcoholysis reaction of polyvinyl ester (hereinafter abbreviated as "PVES") on condition that the specific distribution of a degree of saponification is caused, and subsequently granulating and drying the reaction product. Preferable examples of the alcoholysis reaction of PVES include a process which comprises saponifying a mixed solution obtained from a solution of partially saponified PVA (A) having a degree of saponification of 20 to 60 mole % and a solution of PVES (B) (hereinafter referred to as "process (1)"), and a process which comprises saponifying a solution of PVES (B) by means of a continuous reactor having a residence time distribution corresponding to that of a series of 2 to 20 of complete mixing tanks (hereinafter referred to as "process (2)").

First, the conditions which are common to processes (1) and processes (2) are described below.

Examples of PVES which is used for a starting material of partially saponified PVA (A) and PVES (B) include a homopolymer of vinyl ester (hereinafter abbreviated as "VES"), a copolymer of different types of VES, and a copolymer of VES and ethylenically unsaturated monomer. Examples of VES include vinyl acetate, vinyl propionate, vinyl stearate, vinyl versatate and vinyl pivalate. Among them, vinyl acetate is preferable. Examples of different types of VES to be copolymerized with vinyl acetate include vinyl stearate and vinyl versatate. Any ethylenically unsaturated monomer is available if it is copolymerizable with VES. Examples thereof include monomers described on pages 281 to 285 in POVAL (revised version, published by Kobunshi Kankokai Apr. 1, 1981) (hereinafter referred to as "publication (A)" and described in the literature quoted on the same pages thereof.

Examples of the polymerization of VES include solution polymerization, emulsion polymerization and suspension polymerization.

It is preferred that the solvent also serves as a reagent of the alcoholysis reaction, said solvent being used for the solution of PVES as a starting material for the solution of partially saponified PVA (A), said solvent being used for the solution of partially saponified PVA (A), and said solvent being used for the solution of PVES (B). As the solvent, an alcohol capable of uniformly dissolving partially saponified PVA (A) and PVES (B) is more preferable, a lower alcohol is more preferable, and a primary alcohol having 1 to 5 carbon atoms is most preferable. Examples of the primary alcohol having 1 to 5 carbon atoms include methanol, ethanol, n-propanol, n-butanol, i-butanol, n-amyl alcohol and i-amyl alcohol. In view of the reaction rate and the solubility of PVES, methanol and ethanol are preferable, and methanol is particularly preferable.

The molar amount of the alcohol is preferably 1 to 50 times the total molar amount of the monomer units of partially saponified PVA (A) and the monomer units of PVES (B). In view of the equilibrium of the alcoholysis reaction and the recovery operation of the alcohol, the molar amount of alcohol is more preferably 1.5 to 30 times, most preferably 2 to 20 times the total molar amount of monomer units of partially saponified PVA (A) and monomer units of PVES (B).

As a catalyst used for the alcoholysis reaction, a basic catalyst which is ordinarily used in the alcoholysis reaction of PVES is available. Examples of the basic catalyst include alkali metal hydroxide such as sodium hydroxide, potassium hydroxide and lithium hydroxide; alkali metal alcoholate such as sodium methylate and potassium t-butoxide; strongly basic amines such as 1,8-diazabicyclo[5,4,0]undecene-7 (DBU); alkali metal carbonate; and alkali metal hydrogencarbonate. Among these, sodium hydroxide is preferable in view of handleability and cost. The amount of the catalyst based on the total molar amount of the monomer units of partially saponified PVA (A) and the monomer units of PVES (B) (hereinafter referred to as a "molar ratio") is generally 0.001 to 1.

Next, process (1) is described below.

The degree of saponification of partially saponified PVA (A) is 20 to 60 mole %, preferably 30 to 50 mole %, most preferably 35 to 45 mole %. The alcohol solution of partially saponified PVA can be obtained by conducting the alcoholysis reaction of an alcohol solution of PVES in the presence of a catalyst, and deactivating the catalyst when it reaches the desired degree of saponification. In the case where the degree of saponification is more than 60 mole %, the handleability becomes poor because the viscosity of the solution is too increased and the PVA precipitates. On the other hand, in the case where the degree of saponification is less than 20 mole %, it becomes difficult to obtain the PVA powder of the present invention because the distribution of the degree of saponification is narrowed.

PVES (B) is substantially unsaponified, and the degree of saponification thereof is particularly preferably 0 mole %.

The mixing weight ratio of component (A) and component (B) as a solid content is preferably between 50:50 and 10:90, more preferably between 50:50 and 20:80, most preferably between 50:50 and 30:70.

The mixed solution of component (A) and component (B) is subjected to the alcoholysis reaction in the presence of the catalyst. As a method of adding catalyst, there are exemplified a method that the catalyst is added after component (A) and component (B) are mixed, and a method that the catalyst is added at the same time when component (A) and component (B) are mixed. As a method of mixing component (A), component (B) and the catalyst, a batch mixer may be used on a small scale, while a continuous mixer is preferable on a large scale.

An example of the alcoholysis reaction using a continuous mixer is described below. A mixed solution of component (A) and component (B) and a catalyst are charged into a continuous mixer, and then mixed. The temperature in the mixer is preferably 40° to 60° C. The residence time in the mixer is desirably determined depending on the viscosity of the solution, the mixing rate and the mixing temperature, but it is generally 0.1 to 20 seconds. The mixture to which the catalyst has been added is subjected to the alcoholysis reaction for 5 to 30 minutes using a belt-type reactor which has been adjusted to approximately 40° to 60° C.

Process (2) is described below.

The continuous reactor can be a continuous reactor in which a residence time distribution at an outlet of a reactor, when continuously feeding the PVES solution alone, corresponds to a residence time distribution of a series of 2 to 20 of complete mixing tanks which are connected in series. The type of the continuous reactor includes an agitator-equipped tank type and an extruder type. A kneader-type reactor is preferable because residual matters are hardly adhered thereto, long-term operation is possible and self-cleanability is excellent.

An example of the alcoholysis reaction using a biaxial kneader-type reactor is described below. The alcohol solution of PVES and the alcohol solution of the basic catalyst are continuously fed separately to a reactor having a residence time distribution corresponding to that of a series of 7 of complete mixing tanks, in which the residence time distribution is relatively broad. Preferably, the temperature in the reactor is 40° to 60° C., the number of revolutions in the biaxial rotators is 5 to 1,000 rpm, and the average residence time is 15 seconds to 5 minutes.

Upon using a reactor having the specific residence time distribution, an alcohol solution of partially saponified PVA having a broad distribution of a degree of saponification is obtained from the outlet of the reactor. The degree of saponification of partially saponified PVA is preferably 10 to 60 mole %, more preferably 20 to 45 mole %. In the case where the degree of saponification is less than 10 mole %, it becomes difficult to obtain the PVA powder of the present invention because the distribution of the degree of saponification is narrowed. On the other hand, in the case where the degree of saponification is more than 60 mole %, the fine particle content is increased. The alcohol solution of partially saponified PVA obtained from the outlet of the reactor is subjected to the alcoholysis reaction for 5 to 30 minutes in the belt-type reactor which has been adjusted to approximately 40° to 60° C.

The PVA gel obtained by process (1) or process (2) is wet-granulated using a wet-granulating device described on page 116 in Publication (A) and described in a literature quoted on the same page thereof. After the granulating, the granulated product is usually dried at a temperature of 100° to 130° C. for 1 to 3 hours, whereby organic solvents such as methyl acetate and methanol contained in the PVA gel are removed, and the PVA powder of the present invention can be obtained.

The PVA powder obtained by the process of the present invention has less amount of fine particles, and therefore sieving operation for removal of fine particles is unnecessary.

Since the PVA powder of the present invention has an excellent solubility in water, an aqueous solution thereof can easily be prepared industrially.

Since the PVA powder of the present invention has a low content of an organic volatile component and a low content of a nonvolatile component such as a carboxylic acid salt or the like which is derived from a basic catalyst, it has an excellent industrial handleability.

EXAMPLES

The present invention is illustrated specifically by the following Examples and Comparative Examples. However, the present invention is not limited thereto. In the following Examples, "% (percent)" means weight-basis unless otherwise specified.

[Measurement of Pore Volume]

A pore volume in PVA powder is measured by mercury pressure-penetration method using a porosity meter (Auto-Pore 9200 manufactured by Shimadzu Corporation).

[Measurement of an Average Diameter]

An average diameter of PVA powder is measured using JIS standard sieves.

[Solubility of PVA Powder at a Fixed Temperature]

PVA powder having a particle diameter of 0.5 to 1 mm (16 mesh-pass to 32 mesh-on) is selected, and the solubility of PVA powder at a fixed temperature is evaluated by the following method.

A 500-milliliter separatory flask equipped with a stirrer, a reflux condenser and a thermometer was charged with 288 g of distilled water, and then placed in an oil bath. The temperature was elevated while stirring the distilled water at 300 rpm. When the inner temperature reached a fixed temperature, 12 g of the PVA powder selected were added thereto, and the mixture was stirred for 30 minutes while the inner temperature was kept constant. The content of the separable flask was filtered, and the amount of PVA contained in the resulting solution was determined by a weight method (namely, the solution was evaporated to dryness, and the solid content in the solution was measured) to measure the solubility (ratio of PVA dissolved based on PVA powder added).

[Solubility of PVA Powder at a Rising Temperature]

The solubility of PVA powder at a rising temperature was measured as the same manner used in the solubility of PVA powder at a fixed temperature except that the starting temperature of water was adjusted to 15° C. and that the temperature was gradually elevated with the passage of time.

Example 1

A methanol solution (water content: 0.1%) of PVAC having a concentration of 35% and a methanol solution of sodium hydroxide (molar ratio: 0.001) were charged into a reactor equipped with an agitating blade, and were mixed with each other. The mixture was subjected to the alcoholysis reaction at 40° C. for 60 minutes. Acetic acid was then added to the reaction mixture to stop the reaction, whereby a methanol solution of partially saponified PVA (A) having a degree of saponification of 41.0 mole % was obtained.

The methanol solution of partially saponified PVA (A) and the methanol solution of unsaponified PVAc (B) having a concentration of 35% were mixed at a mixing weight ratio of 45:55 as a solid content and the temperature was adjusted to 50° C. This mixed solution and a methanol solution of sodium hydroxide (molar ratio: 0.01) were separately fed to a continuous instantaneous mixer, and the mixture was continuously discharged therefrom. The average residence time was 2 seconds.

Subsequently, the mixture was allowed to stand in a reactor of 50° C. for 20 minutes to conduct the alcoholysis reaction, whereby a PVA gel was obtained. The PVA gel was granulated, and then dried at 105° C. for 2.5 hours to give a PVA powder. The results are shown in Table 1.

Examples 2 to 3 and Comparative Examples 1 to 2

PVA powder was obtained in the same manner as in Example 1 except that the conditions shown in Table 1 were used.

TABLE 1

| | Degree of saponification of PVA (A) (mole %) | Degree of saponification of PVAc (B) (mole %) | (A):(B) mixing ratio (weight ratio) | Saponification time (min) | PVA powder | | | |
|---|---|---|---|---|---|---|---|---|
| | | | | | Degree of polymerization | Degree of saponification (mole %) | Pore volume (cc/g) | Fine particle content (%) |
| Example 1 | 41.0 | 0 | 45:55 | 20 | 1750 | 99.1 | 0.15 | 0.07 |
| Example 2 | 41.0 | 0 | 35:65 | 20 | 1750 | 98.6 | 0.11 | 0.05 |
| Example 3 | 36.5 | 0 | 45:55 | 20 | 1750 | 99.0 | 0.11 | 0.08 |
| Comparative Example 1 | 41.0 | 0 | 8:92 | 20 | 1750 | 99.0 | 0.02 | 0.05 |
| Comparative Example 2 | 19.1 | 0 | 45:55 | 20 | 1750 | 98.7 | 0.03 | 0.05 |

Example 4

A methanol solution of partially saponified PVA (A) obtained as in Example 1, a methanol solution of unsaponified PVAc (B) having a concentration of 35% and a methanol solution of sodium hydroxide (molar ratio: 0.01) were charged into a reactor equipped with an agitating blade, and were mixed. The mixture was subjected to alcoholysis reaction at 50° C. for 20 minutes to obtain a PVA gel. The mixing weight ratio of component (A) and component (B) as a solid content was 45:55. The PVA gel was granulated, and dried at 105° C. for 2.5 hours to give a PVA powder. The results are shown in Table 2.

Examples 5 to 8 and Comparative Examples 3 to 6

PVA powder was obtained in the same manner as in Example 4 except that the conditions shown in Table 2 were used. The results are shown in Table 2.

Comparative Example 7

A reaction vessel was charged with 900 ml of a mixed solution of methyl acetate having a concentration of 10% and methanol having a concentration of 90%, and 70 ml of a methanol solution of sodium methylate having a concentration of 10%. The temperature was adjusted to 25° C. While the mixture was uniformly agitated in the reaction vessel, 10 ml/min of a mixed solution of PVA having a degree of saponification of 20 mole % and a concentration of 30% in methyl acetate with a concentration of 10% and a methanol having a concentration of 90%, and 1.8 ml/min of a methanol solution of sodium methylate having a concentration of 10% were charged therein. The reaction product was continuously discharged therefrom to give fine particles of PVA gel (which corresponds to PVA gel fine particles of the slurry saponification obtained by prior art (C). The average residence time was 8 hours.

The fine particles of the PVA gel were dried at 105° C. for 2.5 hours to give a PVA powder. The results are shown in Table 2.

Comparative Example 10

The PVA powder obtained in Comparative Example 7, the solubility of the PVA powder at a fixed temperature in water at 50° C. was evaluated. The results are shown in Table 3.

TABLE 2

| | Degree of saponification of PVA (A) (mole %) | Degree of saponification of PVAc (B) (mole %) | (A):(B) mixing ratio (weight ratio) | Saponification time (min) | PVA powder | | | |
|---|---|---|---|---|---|---|---|---|
| | | | | | Degree of polymerization | Degree of saponification (mole %) | Pore volume (cc/g) | Fine particle content (%) |
| Example 4 | 41.0 | 0 | 45:55 | 20 | 1750 | 98.7 | 0.11 | 0.09 |
| Example 5 | 41.0 | 0 | 35:65 | 20 | 1750 | 98.6 | 0.09 | 0.09 |
| Example 6 | 41.0 | 0 | 25:75 | 20 | 1750 | 98.6 | 0.06 | 0.10 |
| Example 7 | 49.8 | 0 | 45:55 | 20 | 1750 | 99.0 | 0.39 | 0.22 |
| Example 8 | 32.4 | 0 | 45:55 | 20 | 1750 | 98.8 | 0.05 | 0.05 |
| Comparative Example 3 | — | 0 | 0:100 | 20 | 1750 | 98.4 | 0.01 | 0.08 |
| Comparative Example 4 | 41.0 | 0 | 8:92 | 20 | 1750 | 98.8 | 0.02 | 0.05 |
| Comparative Example 5 | 19.1 | 0 | 45:55 | 20 | 1750 | 98.4 | 0.03 | 0.10 |
| Comparative Example 6 | 10.3 | 0 | 50:50 | 20 | 1750 | 98.7 | 0.02 | 0.08 |
| Comparative Example 7 | (slurry saponification) | | | 480 | 1750 | 98.5 | 0.50 | 5.3 |

Example 9

PVA powder was obtained in the same manner as in Example 1 except that the saponification time in the reactor was 15 minutes. The results are shown in Table 3.

TABLE 3

| | Degree of saponification of PVA (A) (mole %) | Degree of saponification of PVAc (B) (mole %) | (A):(B) mixing ratio (weight ratio) | Saponification time (min) | PVA powder | | | | Solubility (%) | |
|---|---|---|---|---|---|---|---|---|---|---|
| | | | | | Degree of polymerization | Degree of saponification (mole %) | Pore volume (cc/g) | Fine particle content (%) | 40° C. | 50° C. |
| Example 9 | 41.0 | 0 | 45:55 | 15 | 1750 | 95.8 | 0.15 | 0.08 | 78 | 100 |
| Comparative Example 9 | — | 0 | 0:100 | 20 | 1750 | 95.7 | 0.01 | 0.08 | 42 | 76 |
| Comparative Example 10 | (slurry saponification) | | | 480 | 1750 | 98.5 | 0.50 | 5.3 | — | * |

*: An lumpy powder was generated to form a block

The solubility of the PVA powder at a fixed temperature in water at 40° C. or 50° C. was evaluated. The results are shown in Table 3.

Comparative Example 9

PVA powder obtained in substantially the same manner as in Comparative Example 3, the solubility of the PVA powder at a fixed temperature in water at 40° C. or 50° C. was evaluated. The results are shown in Table 3.

Example 10

PVA powder was obtained by drying the PVA gel obtained in Example 9 at 140° C. for 5 hours (the pore volume and the fine particle content were the same as those in Example 9). The solubility of the PVA powder at a rising temperature was evaluated. The results are shown in Table 4.

Comparative Example 11

PVA powder was obtained by drying the PVA gel obtained in Comparative Example 9 at 140° C. for 5 hours (the pore volume and the fine particle content were the same as those in Comparative Example 9), the solubility of the PVA powder at a rising temperature was evaluated. The results are shown in Table 4.

TABLE 4

| Dissolution temperature (°C.) | | 20 | 30 | 40 | 50 | 60 | 70 |
|---|---|---|---|---|---|---|---|
| Dissolution time (min) | | 4 | 12 | 21 | 31 | 42 | 55 |
| Solubility (%) | Example 10 | 0.5 | 3 | 21 | 63 | 100 | — |
| | Comparative Example 11 | 0.3 | 1 | 3 | 29 | 65 | 95 |

Example 11

A kneader-type reactor (effective volume=0.1 liter, L/D=7.8, diameter of a shaft=1 inch) in which a jacket temperature was 61° C. and a number of revolutions was 130 rpm was charged with 45 ml/min of a methanol solution of PVAc having a concentration of 35% and 1.2 ml/min of a methanol solution of sodium hydroxide (molar ratio: 0.01) which had been heated at 55° C., and the saponification was conducted. A saponification product (temperature: 55° C., degree of saponification: 40 mole %) in solution was discharged from the outlet of the reactor. The average residence time was 2.2 minutes. The saponification product discharged from the reactor was allowed to stand in a constant-temperature bath of 55° C. for 30 minutes to conduct post-saponification, whereby a PVA gel was obtained. This PVA gel was granulated, and then dried at 105° C. for 2.5 hours to give a PVA powder having a degree of polymerization of 1,750, a degree of saponification of 99.5 mole %, a pore volume of 0.35 cc/g and a fine particle content of 0.5%.

While the methanol solution of PVAc having a concentraiton of 35% was continuously fed under the above-mentioned conditions, a coloring agent (neutral red) was added thereto. It was then shown that the residence time distribution corresponds to that of a series of 5 of continuous complete mixing tanks was provided.

What is claimed is:

1. A polyvinyl alcohol powder having pores with an average diameter ranging from 0.1–10 μm and a pore volume ranging from 0.05–0.4 cc/g, said polyvinyl alcohol powder exhibiting excellent solubility in water.

2. The polyvinyl alcohol powder according to claim 1, wherein a content of fine particles having an average diameter of 74 μm or less is 3 percent by weight or less.

3. The polyvinylalcohol powder according to claim 1, wherein the degree of polymerization of said PVA powder is 300–20,000.

4. The polyvinylalcohol powder according to claim 1, wherein the degree of saponification of the PVA powder ranges from 80–100 mol %.

5. The polyvinylalcohol powder according to claim 4, wherein said degree of saponification ranges from 90–100 mol %.

6. A process for producing the polyvinylalcohol powder of claim 1, which comprises:

saponifying a mixed solution obtained from a solution of partially saponified polyvinylalcohol (A) having a degree of saponification of 20–60 mol % and a solution of polyvinyl ester (B).

7. The process of claim 6, wherein the saponification is conducted in a solvent of a lower alcohol having from 1–5 carbon atoms.

8. The process of claim 6, wherein the amount of alcohol solvent ranges from 1–50 times the total amount of monomer units of partially saponified PVA (A) and monomer units of PVES (B), all on a molar basis.

9. The process of claim 6, wherein the saponification is conducted in the presence of a basic catalyst of an alkali metal hydroxide, an alkali metal alcoholate, a strongly basic amine, an alkali metal carbonate or an alkali metal hydrogen carbonate.

10. The process of claim 9, wherein said basic catalyst is sodium hydroxide.

11. The process of claim 9, wherein the amount of catalyst ranges from 0.001–1 on a molar basis the amount of monomer units of partially saponified PVA (A) and monomer units of PVES (B).

12. The process of claim 6, wherein the weight ratio of component (A) to component (B) in the mixture, as solids content, ranges from 50:50 to 10:90.

13. The process of claim 12, wherein said weight ratio ranges from 50:50 to 20:80.

14. A process for producing the polyvinylalcohol powder of claim 1, which comprises:

saponifying a solution of polyvinyl ester (B) in a continuous reactor having a residence time distribution corresponding to that of a series of 2 to 20 of complete mixing tanks.

15. The process of claim 14, wherein the temperature in the reactor ranges from 40°–60° C.

16. The process of claim 14, wherein the degree of partial saponification of the PVA ranges from 10–60 mol %.

* * * * *